Sept. 10, 1968     T. HUTSON, JR     3,401,211
1-OLEFIN PRODUCTION
Filed April 25, 1966
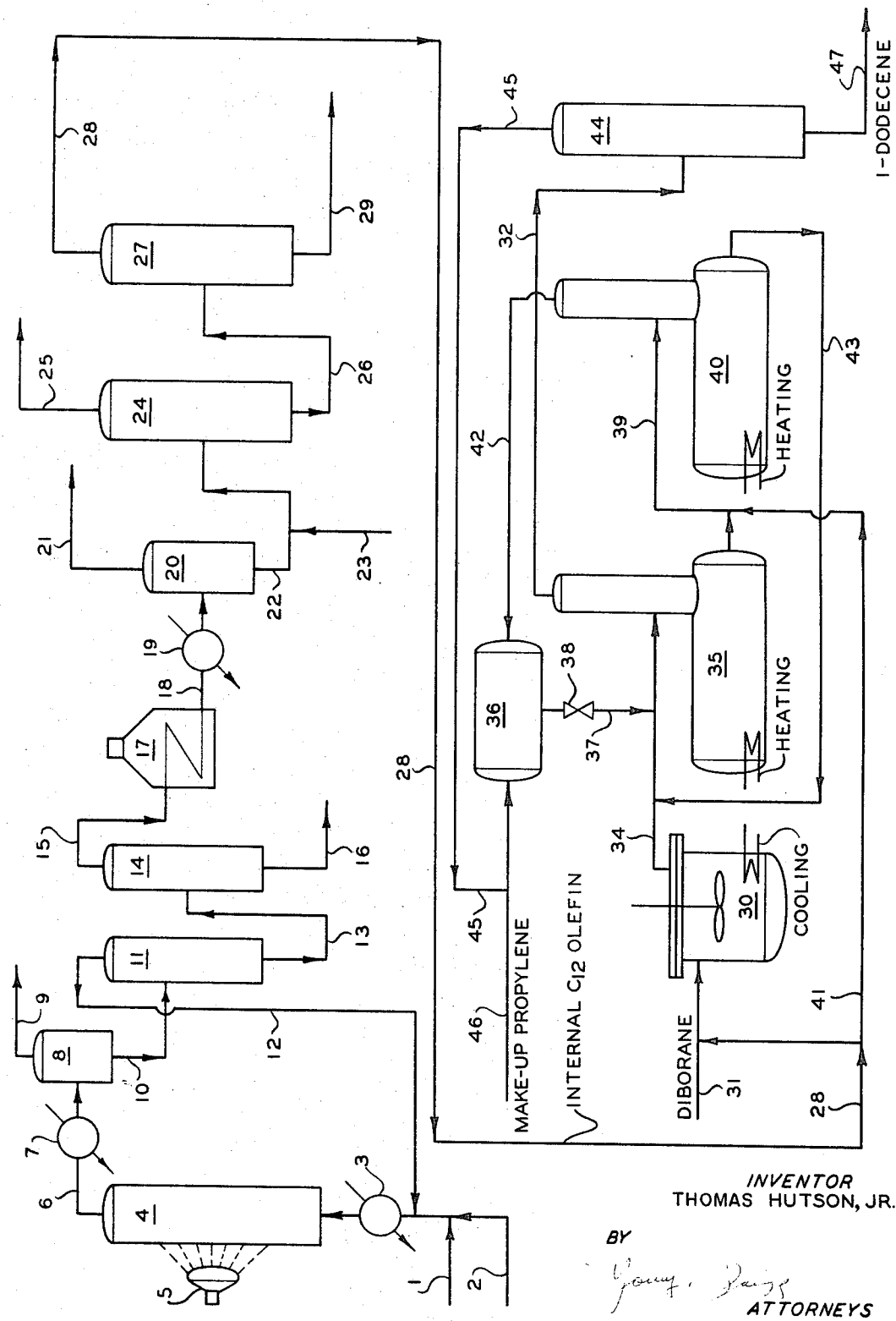
INVENTOR
THOMAS HUTSON, JR.
BY
ATTORNEYS

United States Patent Office 3,401,211
Patented Sept. 10, 1968

3,401,211
1-OLEFIN PRODUCTION
Thomas Hutson, Jr., Bartlesville, Okla., assignor to Phillips Petroleum Company, a corporation of Delaware
Filed Apr. 25, 1966, Ser. No. 545,092
4 Claims. (Cl. 260—683.2)

ABSTRACT OF THE DISCLOSURE

Saturated alicyclic hydrocarbons are converted to terminal olefins to the substantial exclusion of by-products by photochlorinating said hydrocarbons, dehydrochlorinating the resultant monochlorinated hydrocarbons to produce monoolefins, separating and recovering the terminal olefins thus produced and selectively isomerizing internal olefins to terminal olefins by hydroboration displacement.

---

This invention relates to the production of 1-olefins. In one aspect, hydrocarbons are photochlorinated, dehydrohalogenated and isomerized to form terminal olefins. In another aspect, saturated hydrocarbons are photochlorinated and dehydrohalogenated and the resultant internal olefins are isomerized to form terminal monoolefins. In yet another aspect, alkanes having from about 7 to about 15 carbon atoms per molecule are photochlorinated and dehydrohalogenated and the resultant internal olefins are isomerized to terminal olefins by hydroboration-displacement.

Numerous methods have been utilized for the production of olefins from saturated hydrocarbon compounds. However, the selectivity of the processes known in the art to the production of 1-olefins is such that substantial fractionation and recycle operation are required to obtain an economically feasible degree of conversion of feed hydrocarbon to the desired olefin. I have found that through a unique combination of steps a higher degree of selectivity to the required intermediate and end products can be achieved so that product separation and recycle operations are minimized. Consequently, through the unique combination of highly efficient chlorination, dehydrochlorination and isomerization operations, in addition to the provision for intermediate separation and recycle, the present invention provides for a process for the production of 1-olefins from saturated hydrocarbons at conversion levels not heretofore obtainable.

It is therefore an object of this invention to provide for the production of terminal olefins from saturated hydrocarbon compounds.

It is another object of this invention to provide for a process and apparatus for the production of 1-olefins from alkanes in high yields.

Other advantages, objects and aspects of this invention will be apparent to one skilled in the art in view of the disclosure, drawings and the appended claims.

In accordance with this invention, suitable hydrocarbon compounds are converted to 1-olefins by the several serial steps of photochlorination, dehydrochlorination and isomerization. More particularly in accordance with this invention, suitable hydrocarbon compounds are photochlorinated at conditions that enhance the selectivity of the chlorination to the corresponding monochlorinated derivatives, the monochlorinated compounds are then dehydrochlorinated in the presence of a catalyst to form the corresponding monoolefins which are subsequently isomerized to convert the internal olefins present to the corresponding terminal olefin thereby effecting a high degree of conversion of saturated hydrocarbon feedstock to terminal olefin product.

More specifically in accordance with this invention, saturated hydrocarbons are photochlorinated and the reactor effluent is fractionated to resolve and recover unreacted feed hydrocarbon and mono- and dichlorinated derivatives. Unreacted hydrocarbon is recycled to the photochlorination zone, dichlorinated derivatives are removed from the system and monochlorinated hydrocarbons are dehydrochlorinated in the presence of a catalyst to effect a high degree of conversion to the corresponding olefins. The effluent from the dehydrochlorination operation comprising unconverted monochlorinated hydrocarbons, HCl, and internal and terminal olefins is fractionated to resolve and recover the several constituents whereby the unconverted monochlorinated hydrocarbons are recycled to the dehydrochlorination operation, HCl is vented from the system, terminal olefin is recovered as product and internal olefin is passed to an isomerization operation wherein it is converted to the corresponding terminal olefin. The feed from the isomerization operation comprising terminal and internal olefin is fractionated to resolve these two constituents whereby the internal olefin is recycled to the isomerization operation and the terminal olefin is recovered as product.

The halogenation and, particularly, the chlorination of hydrocarbons has been accomplished in both gaseous and liquid phases by various means. Light and, particularly, ultraviolet light is a known catalyst for the chlorination of paraffin hydrocarbons. However, the production of a monohalogenated hydrocarbon without substantial concurrent production of more highly chlorinated derivatives has been difficult due to the fact that the halogenation reaction occurs stepwise and is not generally equilibrium limited. Therefore, given sufficient residence time and sufficient halogen, particularly chlorine, at reaction conditions, the reaction product will contain no monohalogenated derivatives at all. For the purposes of the present invention, it is highly desirable to promote the selective conversion of saturated hydrocarbon feedstock to the corresponding monohalogenated derivative while substantially limiting conversion to more highly halogenated derivatives. It is therefore preferred in the process of this invention, to employ as the photochlorination step the process described in copending Ser. No. 248,543. Briefly, in the process of that invention, a liquid hydrocarbon stream such as n-heptane is treated in several serial photochlorination zones wherein the hydrocarbon, saturated with halogen, is subjected to ultraviolet radiation of sufficient intensity to provide for substantial utilization of the halogen present in each stage. Where chlorine is employed as the halogen, HCl is produced in each reactor and is removed from the reactor effluent by flashing. The resultant mixture of unconverted and halogented feed hydrocarbon is contacted with additional halogen and cooled before exposure to ultraviolet radiation at halogenating conditions in a subsequent photochlorination zone wherein additional conversion to chlorinated hydrocarbon takes place. Through such a mode of operation the reaction temperature is kept low and the amount of halogen present is maintained considerably below a stoichiometric equivalent which conditions provide for a high degree of selectivity to the production of monochlorinated derivatives. The effluent from the photochlorination zone is fractionated to recover unconverted hydrocarbon which is recycled to the photochlorination zone, monochlorinated hydrocarbons which are passed to the subsequent dehydrochlorination operation and more highly halogenated derivatives which are removed from the system.

The dehydrohalogenation conditions employed in the process of this invention are desirably such that conversion of the chlorinated hydrocarbons to olefin is accomplished with only a minimum production of undesirable by-products. It is known that in many cases such reactions can be thermally initiated. Thus, heating at elevated temperatures is frequently sufficient to split-off the hydrogen halide from the molecule with the consequent production of olefin. However, for greater convenience and for the purpose of eliminating undesirable side reactions, it is preferred to accomplish the dehydrohalogenation at relatively lower temperatures while enhancing the conversion rate by conducting the reaction in the presence of a suitable catalyst. A number of such catalysts have been disclosed in the art such as metals, metal salts, and other composites containing refractories, clays, alloys, and the like. Although many of these methods of dehydrochlorination can be employed to accomplish the desired function in the process of this invention, it is presently preferred that the dehydrochlorination be conducted in the presence of high surface oxidized carbon or pellets diatomite in conjunction with a ceramic binder at a temperature in the range of from about 750 to about 850° F. The effluent from the dehydrochlorination operation comprising HCl, terminal olefin, internal olefin and possibly some unconverted halogenated hydrocarbon is fractionated to remove HCl from the system, to recover terminal olefin as product and unconverted halogenated hydrocarbon as recycle to the dehydrochlorination operation. The internal olefins recovered in such fractionation operations are passed to a subsequent isomerization operation wherein they are converted to the desired 1-olefin.

In practicing the isomerization operation employed in the process of this invention, it can be any one of numerous methods that have been found effective for converting internal olefins to terminal olefins. The isomerization of olefins is a well known phenomena. The double bond present in olefinic hydrocarbons is rather labile and, accordingly, it shifts rather readily.

Methods well known in the art, however, have generally required that the isomerization of the olefinic unsaturation to the terminal position requires rather high temperatures to accomplish any substantial degree of conversion. Such high reaction temperatures, generally in excess of 700° F., result in undesirable thermodecomposition of feed and products alike with the consequent production of coke and gaseous by-products which undesirably affect the overall operation and particularly the isomerization yield. It is, therefore, preferred in the process of the present invention to employ as the isomerization step, a mode of operation that does not require the excessively high temperatures that result in the above-described disadvantages. The presently preferred mode of isomerization is the hydroboration-displacement technique described by H. C. Brown and G. Zweifel, Journal of American Chemical Society, 82, 1504, 1960. Generally, this technique involves the reaction of hydrogenboride with the internal olefin to produce the corresponding trialkylborane which is isomerized at from about 100° C. to about 175° C. to produce the corresponding terminal boronalkyl. This terminal alkyl is then contacted with displacement 1-olefin used in excess in the league of 160° C. to displace the boron from the alkyl radical with the consequent production of the desired terminal olefin.

A more complete understanding of the concept of the present invention can be obtained by reference to the attached drawing which shows in schematic form the several features of photochlorination, dehydrochlorination, and isomerization as well as the required and preferred fractionation, recycle and recovery facilities.

In the drawing, the hydrocarbon feed to be converted to olefin is passed by way of pipe 1 and cooler 3 to photochlorination zone 4. Prior to its introduction into the photochlorination zone, the hydrocarbon feed is admixed with chlorine which is introduced by way of pipe 2. The photochlorination can be conducted in several serial stages as previously described or can be conducted in a single stage in the presence of high concentrations of chlorine and high intensities of ultraviolet radiation depending upon the selectivity of conversion to monochlorinated products desired. In the photochlorination zone, the mixture of hydrocarbon and chlorine is subjected to ultraviolet radiation from a suitable source 5 having a wavelength of from about 2500 A. to about 6000 A. at a temperature of from about 40 to about 280° F. for a reaction time of from 5 to about 25 seconds in each reactor where one or more stages are employed.

In such operations the preferred hydrocarbon feedstock is a normal alkane having from about 7 to about 15 carbon atoms per molecule in which case a pressure from about 40 to about 60 p.s.i.g. is required at chlorination conditions to maintain liquid phase. In the presently preferred mode of operation, the amount of chlorine added to the photochlorination zone is that required to give the desired conversion of hydrocarbon. Under such conditions, the residence time of preferably about 15 seconds in each serial chlorination zone is sufficient to provide for the conversion of substantially all of the halogen present. It should be pointed out that although a wide range of hydrocarbon feedstocks can be employed in the concept of this invention it is presently desirable for reasons of operability and product distribution to substantially limit the hydrocarbon feed to no more than two adjacent homologues of the alkane series, and it is generally preferred to employ a hydrocarbon feedstock comprising primarily only one member of the alkane series within the range above-noted.

The effluent from the photochlorination zone comprising HCl, unconverted hydrocarbon, mono- and dichlorinated derivatives is passed by way of pipe 6 and cooler 7 to flash drum 8 wherein the HCl is removed as overhead by way of pipe 9 and vented from the system. The remaining hydrocarbon phase having therein only a negligible amount of HCl is removed by way of pipe 10 and passed to fractionation column 11 wherein unreacted hydrocarbon is removed as overhead product by way of pipe 12 and recycled into admixture with the fresh feed to the photochlorination zone. Bottoms product comprising primarily chlorinated hydrocarbons is passed by way of pipe 13 to distillation column 14 wherein the monochlorinated derivatives are removed as overhead by way of pipe 15 and more highly halogenated derivatives are removed from the system by way of pipe 16. The monohalogenated derviatives are passed by way of pipe 15 to dehydrochlorination zone 17 wherein they are contacted with a suitable dehydrochlorination catalyst at a temperature of from about 750 to about 850° F. The catalyst employed in this operation can be any that will achieve a substantial degree of conversion to the desired products, and in the presently preferred embodiment of this invention either oxidized carbon or diatomite in conjunction with a ceramic binder can be employed. Where diatomite is employed, it has been found advantageous to treat the catalyst material before its introduction to the dehydrochlorination zone with a 10 percent aqueous solution of potassium hydroxide. Where dodecane is employed as the hydrocarbon feed to the photochlorination zone and the liquid hourly space velocity in the dehydrochlorination zone is maintained in the range from about 0.5 to about 2.0 the conversion of monohalogenated derivative to the corresponding olefin is in the range of about 95 to about 99 percent with a selectivity to n-dodecene-1 of about 95 to about 99 percent.

The effluent from the dehydrochlorination zone comprising HCl, 1-olefin, and internal olefins is passed by way of pipe 18 and cooler 19 to a suitable flash vessel 20 wherein HCl is removed as overhead through pipe 21 and vented from the system. The remaining hydrocarbon phase comprising primarily olefinic hydrocarbon is removed by way of pipe 22 and can be admixed with recycle internal olefin from the isomerization zone hereinafter detailed. This mixed feed is introduced to a suitable fractionation zone 24 wherein terminal olefin product is removed as overhead by way of pipe 25 and internal olefin along with a small amount of high molecular weight material produced in the dehydrochlorination zone is removed as bottoms product by way of pipe 26. This mixture is further fractionated in a suitable fractionation zone 27 wherein internal olefin is removed as overhead product and relatively high molecular weight materials are removed from the system by way of pipe 29.

The internal olefins are passed by way of pipe 28 to a suitable stirred reactor 30 wherein they are contacted with a solution of diborane in diglyme, which is the dimethylether of diethylene glycol, supplied to the reactor by way of pipe 31. In the presently preferred embodiment of this invention, a reaction time of about 30 seconds at 20° C. is employed in reactor 30 to effect the production of the desired borane derivative. This derivative is then passed by way of pipe 34 to a suitable fractionator 35 which in this embodiment comprises fractional distillation apparatus operated under heavy reflux at a preferred temperature of 180° C. for an average residence time of from about 1 to about 3 hours in order to effect the isomerization of the internal olefin to 1-olefin. Propylene, in an amount in excess of the stichiometric quantity required to displace the olefin present in column 35, is passed from accumulator 36 via pipe 37 as controlled by suitable valve means 38 into admixture with the borane derivative from stirred reactor 30 and is then passed to column 35 to displace the 1-dodecene. The 1-dodecene thus displaced and the excess propylene present in column 35 are passed as overhead by way of pipe 32 while propylene borane is removed as kettle product from column 35 by way of pipe 39 and is introduced to column 40. A part of the internal olefins passing through pipe 28, sufficient to displace propylene from the propylene borane, is passed by way of pipe 41 into admixture with the propylene borane in column 40. The propylene thus displaced is recovered as overhead product from fractionator 40 and is passed by way of pipe 42 to accumulator 36. In the presently preferred embodiment of this invention, the average residence time of the latter described displacement step effected in column 40 is about 1 hour. Similar to the operation of column 35, column 40 is also operated under heavy reflux in the presently preferred mode of operation. Bottoms product from column 40, comprising tridodecylborane and diglyme is recycled to isomerization column 35 by way of pipe 43. The overhead product from column 35, comprising 1-dodecene product and excess propylene, is passed by way of pipe 32 to fractionator column 44, in which the propylene and 1-dodecene are separated; the propylene being recovered as overhead product and passed by way of line 45 to accumulator 36, and product 1-dodecene being recovered as bottoms product by way of pipe 47. Make-up propylene is supplied to accumulator 36 by way of pipe 46 to accommodate for losses in the operation.

The hydroboration is preferably carried out in the presence of 10 to about 20 percent excess hydride to insure the quantitative utilization of olefin. The use of a suitable solvent such as diglyme (diethylglycol monomethyl ether) is preferred. However, the quantity of hydride employed can be varied as desired depending upon degree of conversion, residence time and reaction temperature. It has been found that the conversion of higher molecular weight internal olefins to the corresponding terminal olefins is substantially slower than the conversion rates of relatively lower molecular weight compounds. It has also been found that the rate of conversion can be substantially increased at higher temperatures in the range of 150° C. However, in the presently preferred range of this invention, the hydroboration reaction is carried out at a temperature from about 75 to about 100° C. and for a residence time of from about 1 to about 3 hours. Higher ultimate conversions are, of course, obtained with longer residence times and higher concentrations of boronhydride. However, it has been found that in the preferred range of operating conditions wherein internal dodecenes are employed as the olefin feed to hydroboration zone and reaction conditions are maintained at about 100° C. and from about 1 to about 3 p.s.i.g. with an excess boronhydride of about 20 percent that the yield of terminal olefin based on feed olefin is in the league of 98 percent. Within the range of operating conditions noted, the ultimate conversions generally achieved are within the range of about 75 to about 98 percent.

This boron displacement is accomplished in the presence of an excess of terminal displacement olefin such as tetradecene-1 which has been found suitable for this purpose wherein the boron alkyl is tridodecylboron. Preferably, because of ease of separation, propylene can be used as the displacement olefin. Theoretically, only a stoichiometric equivalent of displacement olefin is required to achieve the desired conversion to the desired terminal olefins. However, it has been found that the presence of about 15 to about 25 molar excess displacement olefin in the displacement reactor greatly enhances the conversion rate and ultimate yield. In one embodiment, as shown in the drawing, the displacement olefin can be admixed with the boron alkyl feed to the displacement zone prior to the introduction of the thus-formed mixture into the reactor. However, suitable conversions can be obtained by introducing these two components to the displacement zone as separate streams. It has been found that the rate of the displacement reaction is enhanced at higher temperatures and that suitable conversions can be achieved at temperatures within the range of from about 125 to about 175° C. However, in the presently preferred embodiment of this invention, wherein dodecane is employed as the feed to the above-described photochlorination zone the temperature in the displacement zone is maintained in the league of about 160° C. The pressure maintained during this operation need only be that required to maintain liquid phase reaction. It has also been found advantageous to provide suitable means for agitating the mixture during its residence in isomerization vessel 30. Residence times in the displacement zone are generally in the range of 0.5 to about 3 hours. However, it has been found that about 90 to about 95 percent conversion of tridodecylborane to terminal dodecene can be accomplished in the presence of 1500 percent excess propylene at about 160° C. where reaction is continued for a period of 2 hours.

Regeneration of the propylene used as displacement hydrocarbon is easily accomplished by contacting this boron alkyl with an equi-molar quantity of internal $C_{12}$ olefin. This step is shown in vessel 40. Approximately one hour is required. The propylene is removed overhead and returned to propylene storage vessel. The tridodecyl borane is recycled to the isomerization reactor vessel 35.

The operation of the above-described fractionation zones need only be suitable to accomplish the required separations. However, it is preferred to maintain the pressure in both of these operations at a relatively low value generally in the range of atmospheric pressure or in an excess thereof for reasons that by such operation lower temperatures are required to accomplish the desired separation. These conditions will, of course, vary depending upon the molecular weight of the feed hydrocarbon and displacement olefin, but it is generally preferred to maintain the fractionation temperatures relatively low in order to avoid any substantial decomposition of the boron alkyls.

Although the description of this invention has been directed to the use of the hydroboration-displacement technique for isomerizing the internal olefins produced in the dehydrochlorination step, it is obvious that other isomerization techniques could be employed to accomplish this purpose. When such other isomerization techniques are employed, it is sometimes desirable to recycle some of the isomerization effluent, as at 23. However, the described hydroboration-displacement technique is very much preferred in that the yields achieved by conventional isomerization are substantially lower and are generally in the league of about 8 percent. Although such operations do accomplish the desired purpose, the low yields derived thereby require substantial fractionation and recycle operations, the need for which is considerably minimized by the use of the described hydroboration-displacement isomerization.

The aforegoing discussion and the attached drawing are only intended to be illustrative of one embodiment of this invention and the application of the concept of this invention in one particular instance and are not intended to limit the scope or the application of the concept of this invention.

Reasonable variation and modification are possible within the scope of the foregoing disclosure, drawing and claims the essence of which is that there is provided a method and apparatus for converting hydrocarbon feedstocks to the corresponding 1-olefins which method comprises photochlorinating the hydrocarbon in the presence of an ultraviolet light, dehydrochlorinating the monochlorinated hydrocarbons thus produced and subsequently isomerizing the internal monoolefins produced in the dehydrochlorination operation to yield 1-olefin.

I claim:

1. A method for producing terminal olefins to the substantial exclusion of by-products from saturated alicyclic hydrocarbons which comprises photochlorinating said hydrocarbons by contacting same in the presence of chlorine with ultraviolet radiation having a wave length of from about 2500 to about 6000 Angstroms at a temperature of from about 40 to about 230° F. to produce an effluent from said photochlorination comprising HCl, unreacted hydrocarbon, monochlorinated and dichlorinated hydrocarbon, fractionating said effluent from said photochlorination to remove HCl as overhead product and the remainder of said effluent being substantially reduced in HCl as bottoms product, fractionating said bottoms product from said flashing operation to produce a first fractionator overhead comprising primarily unconverted hydrocarbon and a first fractionator bottoms product comprising primarily said chlorinated hydrocarbons, passing said unconverted hydrocarbon in said first fractionator overhead as recycle to said photochlorination step, fractionating said chlorinated hydrocarbons in a second fractionator to produce a second fractionator overhead product comprising primarily said monochlorinated hydrocarbon and a second fractionator bottoms product comprising primarily said dichlorinated hydrocarbon, passing said monochlorinated hydrocarbon in said second fractionator overhead product as feed to a dehydrochlorination step wherein said monochlorinated hydrocarbons are contacted with a basic catalyst at a temperature within the range of from about 750 to about 850° F. and a pressure of from about 40 to about 60 p.s.i.g. to convert said monochlorinated hydrocarbon to olefins, flashing the effluent from said dehydrochlorination zone to produce an overhead comprising primarily HCl and a bottoms product comprising the remainder of said dehydrochlorination effluent substantially reduced in HCl concentration and comprising chlorinated hydrocarbons, terminal and internal olefins, passing said last bottoms product to a third fractionation zone to produce a third fractionator bottoms product comprising primarily said chlorinated hydrocarbons from said dehydrochlorination step and recycling said third fractionator bottoms product to said dehydrochlorination zone, recovering the remainder of said effluent from said dehydrochlorination zone as overhead from said third fractionation zone and passing the same to a fourth fractionation zone to produce a fourth fractionator overhead comprising primarily said terminal olefins and a fourth fractionator bottoms product comprising primarily said internal olefins, recovering said fourth fractionator overhead comprising terminal olefins, contacting said fourth fractionator bottoms product containing internal olefins with hydrogen boride at a temperature of from about 70 to about 100° C. to convert at least part of said internal olefin to terminal boron alkyl, fractionating the effluent from said hydroborating step comprising a mixture of internal olefin and a terminal boron alkyl to recover internal olefin as overhead and boron alkyl as bottoms product, recycling said internal olefin to said hydroborating operation, contacting said terminal boron alkyl with displacement olefin at a temperature of from about 100 to about 175° C. to convert the terminal boron alkyl to the corresponding terminal olefin, fractionating the thus formed reactant mixture of terminal olefin, displacement olefin and terminal boron alkyl to recover terminal olefin as product, and recycling the thus recovered boron alkyl and displacement olefin to said last contacting step.

2. The method of claim 1 wherein said saturated alicyclic hydrocarbons have from about 7 to about 15 carbon atoms per molecule.

3. The method of claim 1 wherein said hydrocarbon is dodecane, and said displacement olefin is tetradecane-1.

4. The method of claim 1 wherein said hydrocarbon comprises primarily two adjacent homologues of the alkane series having from about 7 to about 15 carbon atoms per molecule.

References Cited

UNITED STATES PATENTS

| | | | |
|---|---|---|---|
| 1,102,655 | 7/1914 | Graul | 260—683.2 |
| 1,202,282 | 10/1916 | Graul | 260—683.2 |
| 1,298,929 | 4/1919 | Graul | 260—683.2 |
| 2,613,233 | 10/1952 | Blumer | 260—683 |
| 1,975,456 | 10/1934 | Hass | 260—683.2 |
| 3,296,108 | 1/1967 | Hutson | 204—163 |
| 3,284,521 | 11/1966 | Fritz | 260—666 |
| 3,290,400 | 12/1966 | Schwarz | 260—666 |
| 2,243,191 | 5/1941 | Cantzler | 260—666 |
| 3,329,731 | 7/1967 | Holiday | 260—666 |

OTHER REFERENCES

Herbert C. Brown et al., J. Amer. Chem. Soc., vol. 82, pp. 1504–5, 1960.

DELBERT E. GANTZ, *Primary Examiner.*

V. O'KEEFE, *Assistant Examiner.*